United States Patent Office 3,738,815
Patented June 12, 1973

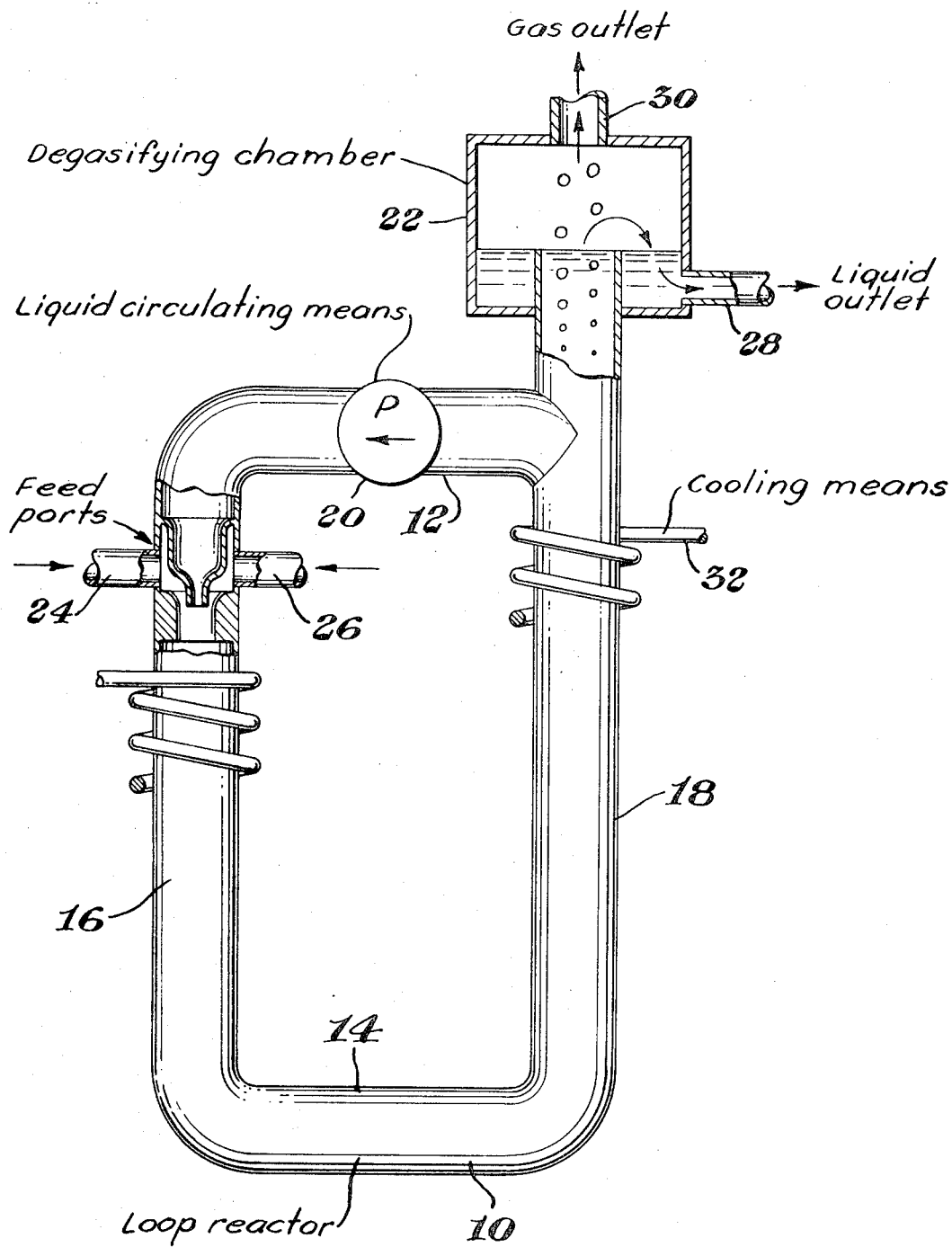

3,738,815
REACTOR FOR REMOVING OLEFINS FROM ACETYLENIC AND OLEFIN-CONTAINING GASEOUS HYDROCARBON MIXTURES
Chester E. Pawloski, Bay City, and Russell L. Stewart, Midland, Mich., assignors to The Dow Chemical Company, Midland, Mich.
Original application Dec. 22, 1967, Ser. No. 692,892, now Patent No. 3,562,349. Divided and this application Oct. 9, 1970, Ser. No. 79,710
Int. Cl. B01j 1/00
U.S. Cl. 23—260                         2 Claims

ABSTRACT OF THE DISCLOSURE

Olefins are substantially removed from an acetylenic and olefin-containing gaseous hydrocarbon mixture by chlorinating said mixture in the presence of the liquid chlorination products of said mixture wherein the temperature is below about 60° C. The process is conducted in a novel reactor comprising a closed tubular loop having feed ports, circulating means, a degasifying chamber including separate outlet ports for liquid and gas, and cooling means for the loop, and the resulting gaseous product is useful as a welding and cutting gas.

CROSS REFERENCE TO RELATED APPLICATION

This application is a division of our copending application Ser. No. 692,892, filed Dec. 22, 1967, now Pat. No. 3,562,349.

BACKGROUND OF THE INVENTION

Methylacetylene and allene usually exist in a mixture. Many efforts have been made to economically separate these two compounds so as to utilize them independently of one another.

It is known that pure allene can be chlorinated in the presence of an inert solvent to give predominantly propargyl chloride (see U.S. 3,110,740). This method of producing propargyl chloride is not commercially feasible because of the costs involved in obtaining pure allene and in separating the propargyl chloride from the large volume of inert solvent required.

SUMMARY OF THE INVENTION

It has now been found that olefins are substantially removed from an acetylenic and olefin-containing gaseous hydrocarbon mixture by chlorinating said mixture in the presence of the liquid chlorination products of said mixture. This result is quite surprising since the acetylenic and olefin-containing gaseous hydrocarbon mixture (hereinafter referred to as mixture A) has both the highly reactive triple bond and the generally less reactive double bond available for reaction. Even so, under the conditions of this process, substantially all of the olefins are reacted to the substantial exclusion of the acetylenes. For example, when this process is applied to the preferred methylacetylene and allene-containing gaseous hydrocarbon mixture, substantially all the allene is reacted to produce predominantly propargyl chloride and 2,3-dichloropropene (both liquid under the reaction conditions) while a surprisingly low portion of the methylacetylene is consumed.

In order to practice this invention, mixture A is chlorinated in an apparatus as shown in the accompanying drawing.

The reactor 10 shown therein is a closed loop of hollow tubing consisting of two horizontal 12, 14 and two vertical 16, 18 legs. It is provided with a liquid circulating means 20 (e.g. a pump) and a product separation chamber 22 (e.g. a degasifying chamber); both of which are located at a point along and coupled through the upper horizontal leg 12 of the reactor. The degasifying chamber 22 is located directly above a vertical leg 18 of the reactor. Two feed ports 24, 26 are coupled through the vertical leg 16 of the reactor which is not below the degasifying chamber 22. A liquid outlet tube 28 is coupled through a wall of the degasifying chamber 22 at the lower portion of said chamber and a gas outlet tube 30 is coupled through the top of said degasifying chamber 22. A cooling means 32 is wrapped around the two vertical 16, 18 and lower horizontal 12, 14 legs of the reactor.

This reactor is designed for a reaction wherein two or more gaseous reactants produce a liquid reaction product and a gaseous product. The gaseous product can be the unreacted gases and/or a gaseous reaction product. Thus, in operation, the liquid reaction products substantially fill the loop reactor and are circulated by the circulating means. The gaseous reactants are introducted into the reactor through the feed ports. The liquid reaction product level is maintained essentially constant because of the liquid product outlet associated with the degasifying chamber. The gaseous product is separated from the liquid reaction product in the degasifying chamber and said gaseous product escapes through the gas outlet located in the chamber.

It is preferred to use a material inert to the reactants and reaction products in constructing the loop reactor (e.g., glass). Although the reactor as shown is described as having two horizontal and two vertical legs, it is to be understood that they do not have to be strictly vertical or horizontal and the loop reactor may approach or even be a circular-shaped reactor. The liquid circulating means is preferably a mechanical pump, but other fluid transfer devices can be employed and, in fact, the feed gases themselves can in some circumstances serve as a gas lift pump. The location of said liquid circulating means is not critical and it can be located at any point along the reactor loop. Similarly, the location of the degasifying chamber, feed ports, cooling means and liquid outlet are not critical to the reactor design. The degasifying chamber can be located at any point along the upper horizontal leg of the reactor (or in other designs, at the highest point of the reactor). The feed ports may be located at a single point or apart from one another at any point along the loop. They are preferably located at a point remote from the degasifying chamber. It is preferred to design said ports as injectors (as shown) but any convenient feed port design can be employed. Although a cooling means is perferred, it is not critical to the apparatus design or the process herein described that it be employed. Said cooling means can be inserted inside the reactor wall as well as wrapped around the outside of the wall as shown. The location of the cooling means is not critical and it can suitably be associated with any portion of the reactor. The liquid outlet can be associated with the degasifying chamber (as shown) or at any convenient point along the loop.

The gas outlet can be located in the upper portion of said degasifying chamber (i.e. along the upper portion of either of the walls or on the top of said chamber).

Mixture A consists of at least one acetylenic hydrocarbon compound and at least one olefinic hydrocarbon compound and includes any one or a combination of any two or more of (1) acetylenics such as acetylene, methylacetylene and other acetylenics having up to five carbon atoms and (2) olefinics such as ethylene, propylene, n-butane, cyclobutene, isobutene, butadiene, allene and other olefins having up to eight carbon atoms.

The pressure used in this process can be atmospheric, subatmospheric or superatmospheric. It is preferred to operate either at atmospheric or at a slightly reduced pressure of between around 250 mm. Hg and 1 atmosphere.

The temperature used can be any temperature below around 60° C. It is preferred to operate at a temperature between around −10° and 30° C.

The reactant ratio of chlorine to olefin is not critical to this process. It is generally preferred to use from 1.0 to 1.5 moles of chlorine per mole of double bond present in mixture A. For example, it is preferred to use from 2.0 to 3.0 moles of chlorine per mole of butadiene present. If less chlorine is present (i.e. less than the lower preferred limit) chlorination will occur to remove only a portion of the olefins present. Excess chlorine (i.e. above the higher preferred limit) will result in attack on the acetylenic bond. When interest is in producing propargyl chloride from allene, it is preferred to use one mole of chlorine per mole of double bond present in mixture A. It is to be understood that, in this situation (i.e. propargyl chloride production), allene is considered as having only one double bond present for mole ratio purposes.

The reaction products depend upon the composition of mixture A, temperature, and the amount of chlorine present. For example, when chlorinating a methylacetylene and allene-containing mixture, the liquid reaction products include predominantly propargyl chloride and 2,3-dichloropropene with varying amounts, if any, of the incidental chlorinated products of mixture A. The gaseous products are the unreacted components of mixture A and hydrogen chloride.

If a reactor similar to the one described is used, a convenient start-up charge is a mixture of the liquid products desired. Of course, one may employ the usual inert liquid solvents as a starting charge, but these are not necessary and are discharged from the reactor as time progresses. Typical of these solvents are toluene, tetrachloroethane, and benzene.

This process is very useful in separating mixtures which have been heretofore very expensive to separate. The gaseous product containing a high ratio of acetylenic to olefinic compounds is a better cutting and welding gas than the entering mixture A. For example, methylacetylene and allene-containing gaseous hydrocarbon mixtures yield two useful products. A product containing a high methylacetylene to allene ratio which is an excellent cutting and welding gas is the gaseous product. The liquid product is predominantly propargyl chloride and 2,3-dichloropropene.

DESCRIPTION OF PREFERRED EMBODIMENTS

Specific examples of chlorinating a methylacetylene and allene-containing mixture follow. In each case, the chlorine and gaseous hydrocarbon mixture were reacted in an apparatus substantially as shown in the accompanying figure. The loop was a 1" glass tube. The liquid circulating means was a 1¼" x 2" "Saran"-lined pump. The feed ports were "Teflon" venturi injectors and the cooling means was a 5 square foot carbon block heat exchanger. The degasifying means was a 3" x 3" x 2" "Saran"-lined T. The results of temperature, pressure and reactant variations are reported below. In each case, the pressure was atmospheric, the time was 30 minutes, the amount of reactant entering during that time is given in grams, the amount of product obtained is given in grams and the temperature is given in ° C. Besides methylacetylene, allene, and other incidental gaseous olefinic hydrocarbons introduced, other hydrocarbons (including propane, isobutane, and cyclopropane) which are not relevant to this invention were a minor part of mixture A. Besides propargyl chloride and 2,3-dichloropropane, other incidental chlorinated products were present in the products in small amounts. The results are reported below in Table I.

TABLE I

| | | Feed, g. | | | Products, g. | | | | Propargyl chloride yield,[1] |
|---|---|---|---|---|---|---|---|---|---|
| | | | | | Gas | | Liquid | | |
| Run No. | Temp., ° C. | Cl₂ | Methyl acetylene | Allene | Methyl acetylene | Allene | Propargyl chloride | 2,3-dichloropropene | |
| 1 | −10.0 | 528.0 | 278.8 | 290.9 | 201.8 | 35.8 | 170.1 | 143.7 | 35.8 |
| 2 | −10.0 | 528.0 | 164.2 | 169.4 | 113.1 | 2.4 | 121.9 | 115.2 | 39.3 |
| 3 | −12.5 | 528.0 | 117.3 | 107.4 | 66.1 | 3.0 | 76.1 | 28.4 | 39.2 |
| 4 | −5.0 | 528.0 | 157.2 | 160.1 | 102.5 | 6.0 | 116.6 | 121.2 | 40.7 |
| 5 | −5.0 | 528.0 | 204.0 | 207.6 | 149.8 | 44.1 | 117.5 | 113.6 | 38.6 |
| 6 | −5.0 | 528.0 | 264.6 | 254.6 | 218.9 | 127.5 | 69.5 | 75.8 | 29.4 |
| 7 | 31.0 | 528.0 | 251.7 | 204.6 | 237.9 | 65.6 | 39.7 | 47.4 | 15.4 |
| 8 | 24.3 | 528.0 | 163.6 | 165.6 | 160.0 | 46.0 | 32.8 | 38.2 | 14.7 |
| 9 | 10.0 | 528.0 | 157.7 | 161.1 | 152.4 | 16.8 | 94.7 | 90.1 | 35.3 |
| 10 | 5.0 | 528.0 | 162.4 | 152.9 | 115.0 | 3.7 | 112.5 | 105.1 | 38.0 |
| 11 | 6.0 | 660.0 | 203.6 | 156.9 | 107.0 | 0.39 | 85.5 | 128.6 | 29.0 |

[1] Percent based on allene.

We claim:
1. A reactor apparatus comprising
   (1) a closed loop of hollow tubing consisting of two horizontal and two vertical legs,
   (2) a liquid circulating means located along and coupled through any leg of the reactor,
   (3) a degasifying chamber located and coupled through the upper horizontal leg of the reactor and comprising
      (a) a gas outlet located along and coupled through the upper portion of the chamber,
      (b) a liquid outlet located along and coupled through the lower portion of the chamber, and
      (c) an inlet connecting the chamber to the upper horizontal leg of the closed loop and extending above the level of the liquid outlet
(4) two feed ports located at substantially the same point along and coupled through a leg of the reactor remote from the degasifying chamber,
(5) a restrictor means located along and coupled through the leg of the reactor adjacent to the feed ports, and
(6) cooling means for cooling said loop.

2. An apparatus as defined in claim 1 wherein the degasifying chamber is located above a vertical leg of the reactor.

References Cited
UNITED STATES PATENTS

| | | | |
|---|---|---|---|
| 3,257,362 | 6/1966 | Norwood | 23—285 X |
| 2,632,028 | 3/1953 | Adams et al. | 23—284 X |
| 2,747,974 | 5/1956 | Felger | 23—252 X |

J. H. TAYMAN, Jr., Primary Examiner

U.S. Cl. X.R.

23—252 R; 259—95; 159—27 A; 55—55, 36, 64; 260—678